United States Patent [19]

Angelucci et al.

[11] 3,725,631
[45] Apr. 3, 1973

[54] ELECTRO-MECHANICAL SERVO DRIVE

[75] Inventors: Thomas L. Angelucci, Cherry Hill; Joseph L. Angelucci, Deptford, both of N.J.; Dan Vilenski, Haifa, Israel

[73] Assignee: Kulicke and Soffa Industries, Inc., Fort Washington, Pa.

[22] Filed: Aug. 30, 1971

[21] Appl. No.: 176,110

[52] U.S. Cl. ............................................. 219/69 G
[51] Int. Cl. .............................................. B23p 1/14
[58] Field of Search ................................... 219/69 G

[56] References Cited

UNITED STATES PATENTS 2,766,050   8/1956   Ballhausen .......................... 219/69 G
3,604,884   9/1971   Olsson ................................ 219/69 G

*Primary Examiner*—R. F. Staubly
*Attorney*—John B. Sowell

[57] ABSTRACT

An electro-mechanical servo drive for precisely moving a miniature EDM electrode into engagement with a workpiece including a precision micrometer lead screw having a drive wheel and a push rod. A movable spindle assembly biased into engagement with the lead screw to eliminate back lash from the spindle assembly and the lead screw, and a drive motor frictionally engaging the drive wheel to impart rotary motion thereto with transmitting vibratory motion.

23 Claims, 6 Drawing Figures

PATENTED APR 3 1973    3,725,631

ELECTRO-MECHANICAL SERVO DRIVE

BACKGROUND OF THE INVENTION

The present invention constitutes an improvement in the field of electrical discharge machining (EDM) and more specifically provides a precise and versatile servo drive for an EDM machine of the type employing miniature electrodes.

In the manufacture of tools used in wire bonding and die bonding processes associated with the manufacture of semiconductor devices, it is desirable to produce finishes approaching ten microinches and to locate and/or EDM apertures in the hardest available materials to tolerance approaching one ten thousandth of an inch. Heretofore, EDM machines capable of providing such accurate results under mass production conditions were not available even though precision screws were available capable of providing the tolerances desired and EDM power supplies were available which could produce the finishes desired.

The major problem in prior art electro-mechanical servo drives were looseness, instability and slow time response of the electro-mechanical system which maintained the relative positions of the workpiece and the miniature electrodes. Any looseness in the mechanical structure, electrical drive or the mechanical drive were usually subject to vibration by the electrical drives and/or the vibratory systems so that tolerances achieved on the workpiece approached the inherent cumulative back lash in the servo drive system. In addition to errors caused by loose structural parts, prior art servo drive systems were not capable of aligning the EDM electrodes in a holding device with consistent and repeatable accuracy under production conditions. Prior art electrode holders were usually patterned after typical large machine tool holders and required fitting, chucking and/or aligning the electrode in a spindle or holder.

SUMMARY OF THE INVENTION

The present invention overcomes the limitation of prior art electro-mechanical servo drives by eliminating the typical structures which are inherently loose and by substituting therefor a precision micrometer lead screw having a drive rod on one end and a drive wheel on the other, a drive motor frictionally engaged with an annular surface of the drive wheel so as to damp out inherent looseness therebetween, and a spindle assembly, slidably mounted on a rigid base and yielding urged into engagement with the drive rod in a manner which eliminates back lash by overcoming the mass inertia of the slidably mounted spindle assembly. The spindle assembly is provided with means for rapidly detaching a cylindrical shaped spindle and replacing it with another in precisely the same location. The spindle is constructed to permit prefabrication and prelocation of the electrode before being attached to the spindle assembly. The motor drive for rotating an electrode in a spindle is friction coupled to a back lash free collet holder. The vibratory system is independent of, and isolated from the electro-mechanical drive system so the movement of the vibratory system is not imparted to the servo drive system.

The electro-mechanical servo drive system is provided with novel means for making rapid-up and rapid-down adjustments of the electrode relative to the workpiece and/or making a workpiece readily accessible.

The electro-mechanical servo drive system is provided with a novel friction drive coupling and a drive limiting device to prevent damage to the electrodes and/or the drive motor.

These and other features, objects and advantages of the invention will become apparent in connection with the following description of a preferred construction read in conjunction with the accompanying drawings.

DESCRIPTION OF THE PREFERRED EMBODIMENT

Figure 1:
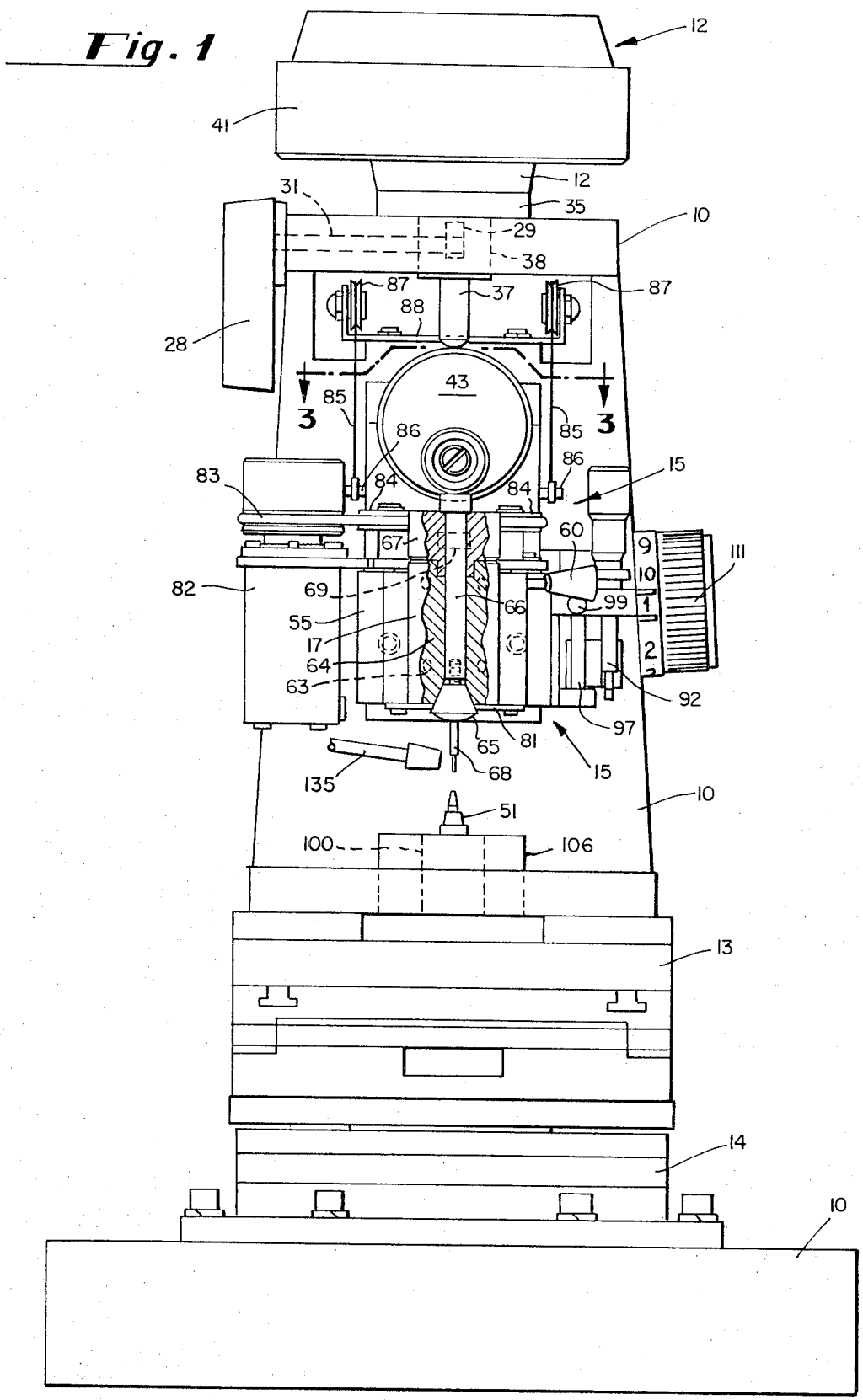
FIG. 1 is a front elevation of an EDM machine shown in partial section.
Figure 2:
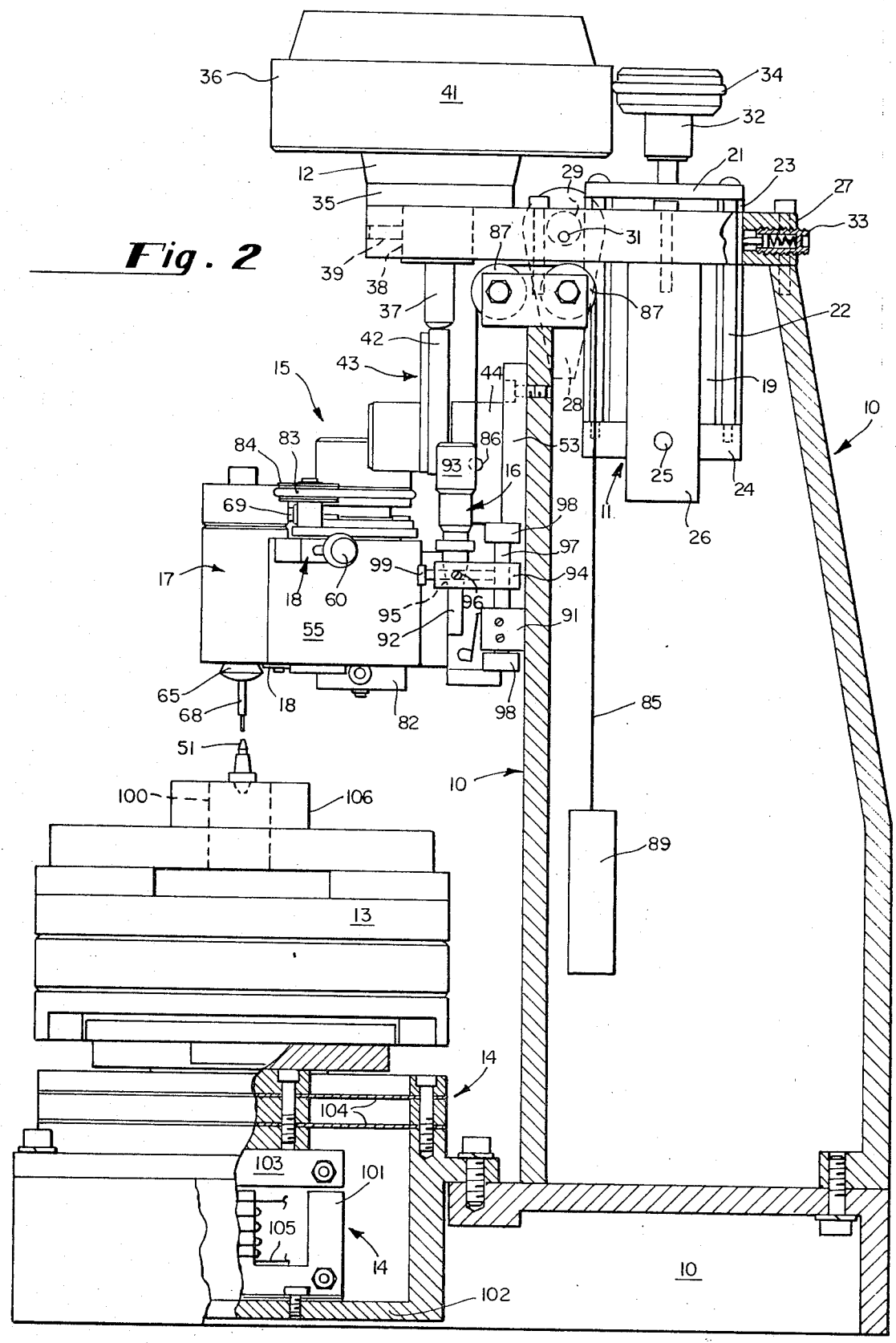
FIG. 2 is a side elevation in partial section of the machine shown in FIG. 1.
Figure 3:
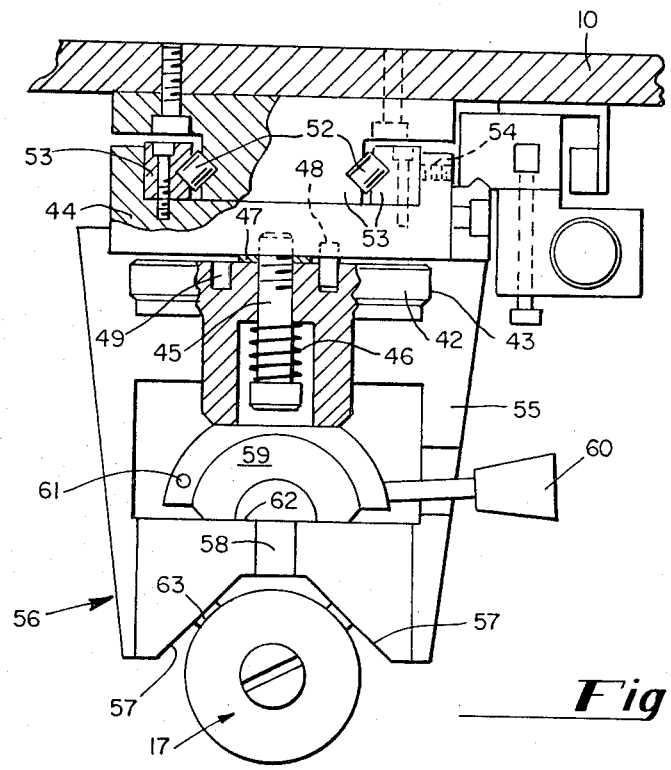
FIG. 3 is a partial section in plane view showing the spindle assembly and the magnetic clamp.

Referring now to FIGS. 1 to 3 of the drawings showing a complete EDM machine embodying the electro-mechanical servo drive of the present invention. A rigid base 10 serves as a mounting platform for the drive motor assembly 11, the precision micrometer lead screw 12, the workpiece holder and manipulator 13, the vibratory system 14, and the spindle assembly 15. The spindle assembly is slidably mounted on the base 10 and supports the limit stop device 16, the spindle 17 and the spindle clamp 18.

Drive motor 19 is provided with a mounting plate 21 which is attached by long bolts 22 and spacer sleeves 23 to a swivel plate 24 pivoted at 25 on a U-shaped bracket 26 attached to the base top plate 27. Motor tilt lever 28 is connected to an eccentric cam 29 by a shaft 31. It will be understood that rotation of the tilt lever 28 is effective to pivot drive motor 19 and drive pulley 32 mounted thereon out of engagement with precision screw 12. When the tilt lever 28 is returned to its normal downward position, drive motor assembly 11 is returned to a normal position by spring plug 33 mounted in the side of the base 10 to permit the resilient O-ring 34 on pulley 32 to engage the precision screw 12.

Precision screw 12 comprises a large diameter commercially available lead screw 35 having a large drive wheel 36 mounted at one end and a rounded push rod 37 mounted at the other. To prevent any movement or slip the screw 12 is tightly fitted in an aperture 38 of top plate and fixed in place by a locking screw 39. The outer annular surface 41 of drive wheel 36 has a height equal to the stroke of screw 12. The drive wheel 36 moves up and down with the lead screw 35 and at the extremes of movement of the lead screw 35 disengages the O-ring 34 from the annular surface 41, thus preventing damage to the lead screw 35, electrode or drive motor 19.

Push rod 37 of lead screw 35 engages the outer annular surface 42 of an adjustable eccentric cam 43 mounted on spindle assembly 15. Cam 43 is mounted on a vertical slider 44 by machined screw 45 and is biased by spring 46 in engagement with spacer washer 47. A pin 48 is fixed in slider 44 and cooperates with a plurality of deep holes 49 in cam 43 to permit the cam 43 to be rotated 180° and fixed at any desired intermediate position. In the preferred embodiment, the cam 43 was mounted off center a distance equal to the normal stroke of the lead screw 35, thus, effectively doubling the stroke of the lead screw 35 as well as providing means for rapidly moving the spindle assembly up or down without changing the setting on the lead screw 35. It will be understood that the eccentric cam 43 is also useful in preventing vibratory motion from being transferred between the precision lead screw and the spindle assembly 15 as well as providing means for extending the range of the lead screw 35. This feature permits changing workpieces 51 or blocking up workpiece 51 without changing the setting of the lead screw 35.

As best shown in FIG. 3 spindle assembly 15 is slidably mounted on base 10 for vertical movement by roller bearings 52 entrapped between precision ground ways 53. A back lash adjustment screw 54 is provided to eliminate all slack. Housing 55 is preferably made of non-magnetic material when the preferred embodiment magnetic spindle clamp 56 is employed.

A vee-shaped groove or precision vee-groove 57 is made of ferro-magnetic material and provided with a non-magnetic separator 58. Permanent magnet 59 is movable by lever 60 and pivotally mounted on pivot pin 61 on housing 55 to permit it to be disengaged from the rear surface 62 of the vee-groove 57, thus, breaking the major magnetic clamping action which holds spindle 17 in place. Spindle 17 is cylindrical in shape which permits it to be precisely located in the vee-groove 57. In the preferred embodiment shown, wear pads 63 are shown exaggerated and extending outwardly from the surface of the vee-groove 57. These pads 63 may be used as a bearing surface for stationary or rotary spindles which have rotating collets as will be explained hereinafter. In the preferred embodiment shown, spindle 17 comprises a hollow cylinder 64 having a tapered collet 65 and a collet holder 66 mounted through the center opening. A rotary contact 67 is mounted on the cylindrical spindle 17 for conducting current from the spark power supply to the electrode 68 through brush 69. Rotating the whole hollow cylinder 64 avoids any misalignment problems due to eccentricity. The collet 65 fits in a precision tapered collet seat in the cylinder 64 and is self centering. It will be recognized that electrodes 68 may be placed in the spindles 17 at locations remote from the spindle assembly 15, thus enabling them to be accurately centered and checked before being placed on the machine.

Figure 4:
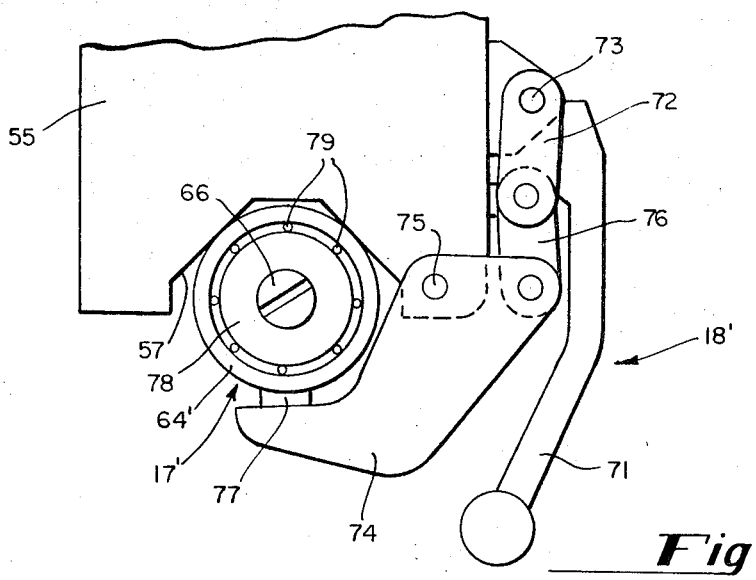
FIG. 4 is a modified embodiment spindle clamp.

FIG. 4 illustrates another form of spindle clamp. Lever 71, attached to link 72, is pivoted at pivot pin 73 on housing 55. Clamp arm 74 is pivoted at pivot pin 75 on housing 55 and is actuated by link 76 which is connected between link 72 and clamp arm 74 to form a toggle. A bearing pad 77 on clamp arm 74 urges spindle 17' into engagement with precision vee-groove 57. Hollow cylinder 64' is provided with an inner rotatable cylinder 78 mounted on bearings 79. It will be understood that the collet 65 and collet holder are unchanged and that the rotary contact 67' (not shown) is adapted to rotate with inner cylinder 78.

Both illustrated spindle clamp devices permit either stationary or rotary spindles to be rapidly fitted in the vee-groove 57 and positioned downwardly on spindle stop 81 before being clamped in an accurate position.

Spindle drive motor 82 drives a flexible belt 83 which is guided over pulleys 84 located opposite rotary contact 67. Belt 83 engages rotary contact 67 and provides means for turning the collet 65 and electrode 68.

A pair of cables 85, connected to spindle assembly 15 by pins 86, are guided over a pair of pulleys 87 mounted on a frame 88 on base 10 and connected to counterweights 89 inside base 10. Counterweights 89 urge the whole spindle assembly 15 into engagement with the push rod 37 of precision screw 12, thus, back biasing any back lash out of the system and the precision screw 12.

It will be understood that drive motors 19 and 82 are connected through flexible friction drives to the driven parts to eliminate transfer of vibration, and that the drive motors themselves are damped and isolated by their mountings even though they are substantially vibration free.

As best shown in FIG. 2, a micro switch 91, mounted on base 10, is adapted to be actuated by the rod end 92 of micrometer 93. As will be explained hereinafter, the micro switch 91 has contacts which interrupt the power supply, thus terminating any EDM operation after a predetermined depth of machining has been reached. Mounting bracket 94 has an aperture 95 therein through which micrometer 93 is inserted and locked by set screw 96. Mounting bracket 94 is slidable on a vertical rod 97 attached to protrusions 98 on spindle assembly 15 and is locked in a desired position thereon by clamp screw 99.

The vibrator 14 shown in FIG. 2 comprises an electromagnet 101 attached to housing 102. Spaced apart from the electromagnet 101 is a ferro-magnetic piston 103 suspended from the housing 102 by spring diaphragms 104. A winding 105 on electro-magnet 101 is connected to a controlled source of pulses (not shown) to enable control of the amplitude and/or frequency of vibration of piston 103.

Micro manipulator 13 is attached to the top plate of the vibrator 14 in a manner to permit vibration of manipulator 13, holder 100, workpiece 51 and tray 106 surrounding the holder 100.

Figure 5:
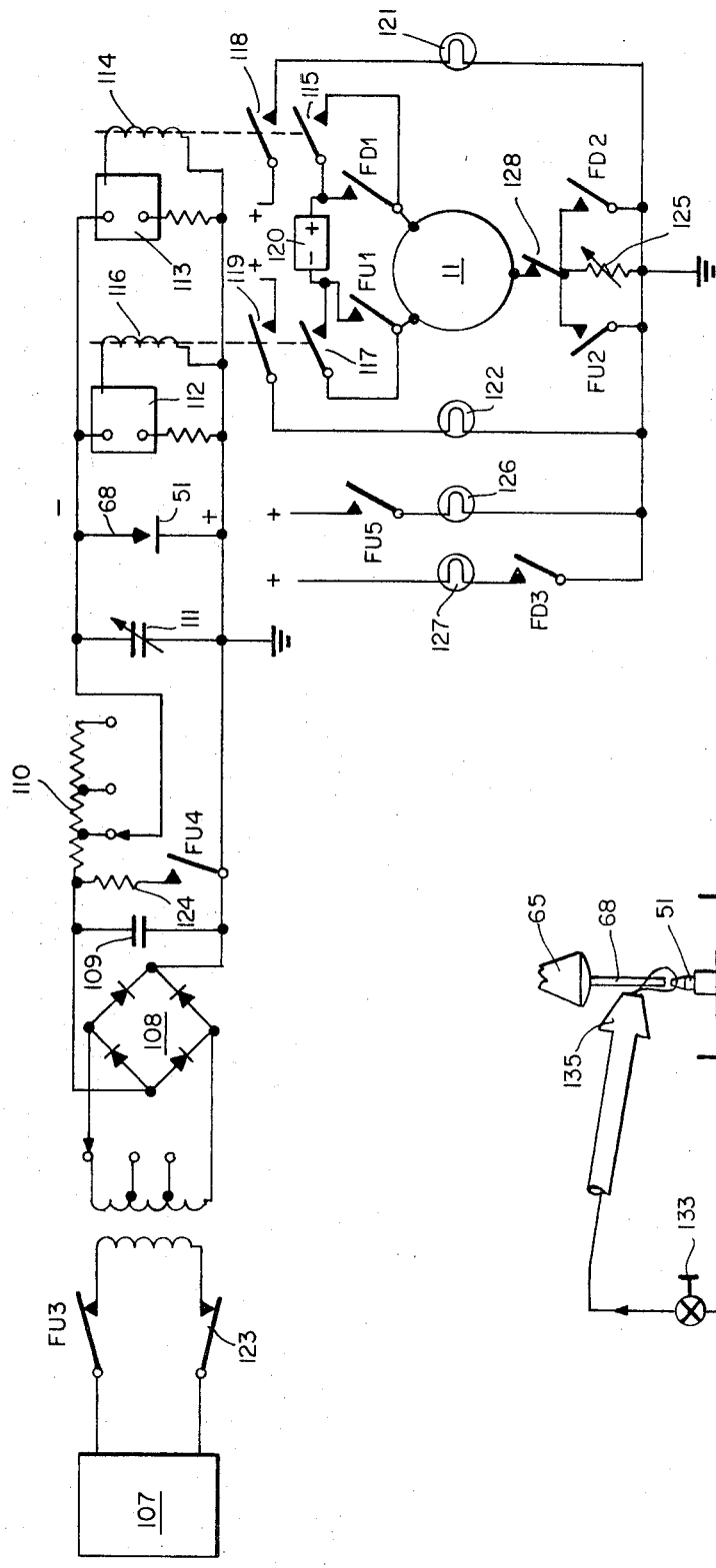
FIG. 5 is a schematic wiring diagram showing the drive motor control means.

Refer now to FIG. 5 showing schematically an electrical wiring diagram of pertinent portions of the present invention. An A.C. power source 107 is transformer coupled to a full wave rectifier 108 and smoothing condenser 109 supplying a resistor-capacitor relaxation oscillator 110, 111. As is well known in EDM art, power adjustment capacitor 111 is charged by the direct current from the EDM power source rectifier 108 until a critical spark firing voltage is reached, at which time a spark is generated across the gap at electrode 68 and workpiece 51. Capacitor 111 discharges across the spark gap 51, 68 removing material from the workpiece and the process is then repeated.

The voltage across the gap at electrode 68 and workpiece 51 is monitored by under-voltage condition senser 112 and over-voltage condition senser 113. When the voltage in the gap is too high, indicative of an undesirably large gap, the over-voltage senser 113 energizes relay 114 which closes contact 115 to start drive motor 11 in a direction which closes the gap and continues to run motor 11 until a predetermined desired voltage condition is reached. When the voltage in the gap is too low (usually indicative of a short in the gap), the under-voltage senser 112 energizes relay 116, which closes contact 117 to start drive motor 11 in a reverse direction which opens the working gap and continues to run motor 11 until a predetermined desired voltage condition is reached, thus restoring the normal working gap. Relays 114, 116 have associated therewith contacts 118 and 119 respectively which turn on lights 121, 122 to provide a visual indication of the direction of movement of electrode 68. Under normal EDM operation, electrode 68 will be moving intermittently down, accordingly lights 121, 122 will provide a skilled operator with a visual indication of the efficiency of operation. The blinking of the lights will enable a skilled operator to adjust the resistor-capacitor 110, 113 and speed of motor 11 at resistor 125.

Under production conditions, it is often desirable to be able to rapidly move the electrode 68 up and away from the workpiece 51. This may be accomplished by disconnecting the power supply 107 at switch 123 and manually turning drive wheel 36 connected to lead screw 35 and/or by rotating eccentric cam 43 to reduce or increase the distance between the spindle assembly 15 and precision screw 12. There is also provided an electrical fast-up switch and a fast-down switch (not shown). When the fast-up switch is depressed, contacts FU1, FU2, FU4, FU5 are closed and FU3 is opened. The power supply 107 to the spark gap is shut off, the condensers 109, 111 are discharged through resistor 124, the drive motor 11 is energized to move electrode 68 up, the speed control resistor 125 is bypassed causing maximum speed, and indicator light 126 indicates fast-up operation. The electrode 68 will move up until stop switch 123 is opened or O-ring 34 disengages drive wheel 36 as previously explained.

When the fast-down switch is depressed, contacts FD1, FD2 and FD3 are closed. Motor 11 will be driven down at full speed and indicator light 127 is on. The power is still supplied to the electrode 68 unless stop switch 123 is opened. When power is being supplied to electrode 68, sensors 112 and 113 are operative, thus electrode 68 will continue down until under-voltage condition senser 112 causes the electrode 68 to move up. It will be understood that continued operation of the fast-down switch will cause drive motor 11 to seek or hunt, but will not damage the delicate electrode 68.

As previously mentioned, micrometer 93 engages micro switch 91 to stop or limit the downward movement of electrode 68. Stop switch 128 is shown in series with drive motor 11 to illustrate the intended function, however, it may be replaced by pairs of contacts in series with the drive motor 11 power supply 120.

Figure 6:
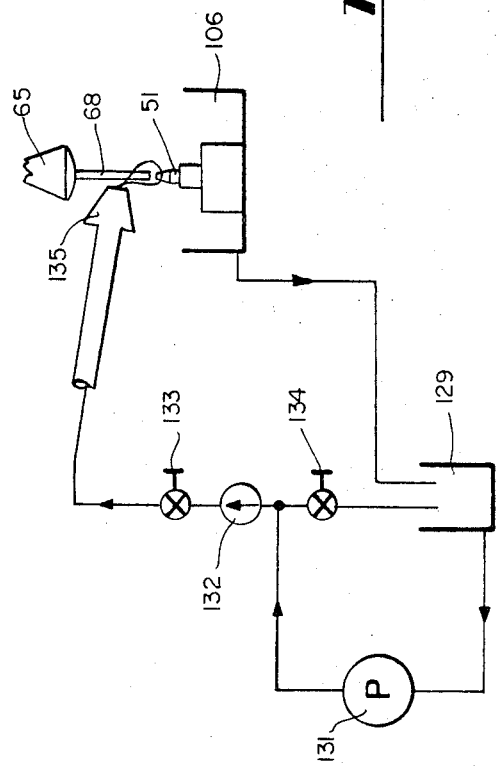
FIG. 6 is a schematic diagram showing a preferred embodiment dielectric fluid supply system.

When performing an EDM operation it is necessary that a dielectric fluid be interposed between the electrode 68 and workpiece 51. FIG. 6 shows in schematic representation of a preferred embodiment dielectric supply system. Dielectric fluid in storage tank 129 is moved by pump 131 through check valve 132 to supply valve 133 and bypass valve 134. The dual valves 133, 134 permit the supply pressure to be lowered to a point where dielectric at supply nozzle 135 appears as a mere trickle or a recurring drop which covers the electrode 68. It was discovered that long electrodes 68 as small as one ten-thousandth of an inch in diameter were being moved or vibrated by the dielectric flow and the problem was eliminated by the novel low pressure flow system. The drops which cover the end of the workpiece do not totally obscure the operation enabling an operator to make observation which could not be made with high pressure flow systems or submerged systems. Fluid from nozzle 135 is caught by tray 106 and returned to tank 129.

Having explained a preferred embodiment EDM electro-mechanical drive system it will be understood that finishes down to ten microns and accuracies to several ten thousandths of 1 inch are obtainable by a machine which is light and simple to manufacture. The essential assemblies are each independantly mounted on the same base and their connecting points are through surface to surface contacts or friction couplings which eliminate transfer of back lash. The functions of the electrical circuitry have been shown schematically, but it will be understood that modification of the circuits shown may be made.

We Claim:

1. An electro-mechanical servo drive for positioning a miniature EDM electrode opposite a workpiece, comprising:
   a rigid base,
   a spindle assembly slidably mounted on said rigid frame for supporting said electrode opposite the workpiece,
   precision screw means mounted on said rigid frame and having a surface to surface loose contact with said spindle assembly,
   anti back lash means urging said spindle assembly into engagement with said precision screw means,
   a drive motor mounted on said rigid frame,
   friction drive means engaging said drive motor and said precision screw means, and
   control means for supplying power to said drive motor to effect forward or reverse rotation for positioning said spindle assembly relative to said workpiece.

2. An electro-mechanical servo drive assembly as set forth in claim 1, wherein said friction drive means comprises a resilient ring mounted on a pulley on said drive motor engaging a drive wheel on said precision screw means.

3. An electro-mechanical servo drive assembly as set forth in claim 2 which further includes a pivot for mounting said drive motor on said frame and spring means for urging said friction drive means into engagement with said drive wheel.

4. An electro-mechanical servo drive assembly as set forth in claim 3 which further includes drive motor tilt means for disengaging said friction drive means from said drive wheel by pivoting said drive motor away from said drive wheel.

5. An electro-mechanical servo drive assembly as set forth in claim 2 wherein said drive wheel on said screw means is provided with an outer cylindrical surface of predetermined height which defines the range over which said friction drive means are engagable with said drive wheel and the upper and lower limits of movement of said spindle assembly by said drive motor.

6. An electro-mechanical servo drive assembly as set forth in claim 1 wherein said spindle assembly further includes a vee-shaped groove adapted to receive a detachable cylindrical shaped spindle.

7. An electro-mechanical servo drive assembly as set forth in claim 6 which further includes a lever actuated toggle connected to a retaining lever for holding said cylindrical shaped spindle into engagement with said vee-shaped groove.

8. An electro-mechanical servo drive assembly as set forth in claim 6 which further includes a permanent magnet engagable with the rear of said vee-shaped groove for magnetically holding said cylindrical shaped spindle into engagement with said vee-shaped groove.

9. An electro-mechanical servo drive assembly as set forth in claim 8 wherein said permanent magnet is pivotally mounted on said spindle assembly and there is further provided a lever on said permanent magnet for pivotally engaging and disengaging said magnet with the rear of said vee-shaped groove.

10. An electro-mechanical servo drive assembly as set forth in claim 1 which further includes an eccentrically mounted cam on said spindle assembly engagable by said precision screw means.

11. An electro-mechanical drive assembly as set forth in claim 10 wherein said eccentrically mounted cam further includes a pin on the spindle assembly cooperable with holes in said cam for fixing said cam in one of a plurality of rotary positions which permit predetermined spacing between the spindle assembly and the precision screw.

12. An electro-mechanical drive assembly as set forth in claim 1 which further includes a micrometer mounted on said spindle assembly cooperable with a micro switch on said base for disconnecting power to said drive motor when a predetermined electrode travel has been made.

13. An electro-mechanical servo drive assembly as set forth in claim 6 wherein said detachable cylindrical shaped spindle comprises a hollow cylinder having a tapered collet and a collet holder mounted concentrically therein.

14. An electro-mechanical servo drive assembly as set forth in claim 13 which further includes a vertical spindle stop mounted on said spindle assembly.

15. An electro-mechanical servo drive assembly as set forth in claim 13 wherein said tapered collet and said collet holder are electrically conductive, and a rotary conductor mounted on the spindle for conducting electrical current from a remote EDM power source to an EDM electrode in said collet.

16. An electro-mechanical servo drive assembly as set forth in claim 1 wherein said control means for operating said drive motor comprises a fast-up and a fast-down switch each having a plurality of electrical contacts associated therewith, at least one of said contacts being operable to disconnect the EDM power source to the EDM electrode.

17. An electro-mechanical servo drive assembly as set forth in claim 16 wherein said plurality of contacts further include contacts which bypass the drive motor speed control device.

18. An electro-mechanical servo drive assembly for efficiently positioning a miniature EDM electrode opposite a workpiece, comprising a rigid base, a spindle assembly slidably mounted on said base for supporting an EDM electrode, a precision screw mounted on said base in engagement with said spindle assembly, a drive motor on said base for turning said precision screw, control means connected in parallel with said electrode and said workpiece, said controls means including a first device for sensing an over-voltage condition, said first device being operable above said over-voltage condition to energize said drive motor in a first direction and to energize a first motor direction indicator lamp, said control means further including a second device for sensing an under-voltage condition, said second device being operable below said under-voltage condition to energize said drive motor in a second direction and to energize a second motor direction indicator lamp thereby visually indicating the presence or absence of movement of said drive motor and the relative efficiency of a machining operation, and a drive motor speed control device for setting optimum cutting speed as indicated by said lamps.

19. An electro-mechanical servo drive assembly as set forth in claim 18 which further includes an EDM power source, and a fastup switch having a plurality of electrical contacts associated therewith, at least one of said contacts being operable to disconnect the EDM power source to the EDM electrode and another of said contacts being operable to bypass the drive motor speed control device.

20. An electro-mechanical servo drive assembly as set forth in claim 19 wherein said plurality of electrical contacts further includes contacts for connecting a shorting resistor in parallel with said EDM power source.

21. An electro-mechanical servo drive assembly as set forth in claim 20 which further includes a limit stop micrometer mounted on said spindle assembly adapted to engage a stop switch mounted on said base, said stop switch being operable to disconnect power to said drive motor.

22. An electro-mechanical servo drive assembly as set forth in claim 1 which further includes means for supplying a dielectric in extremely small controlled amounts to the tip of the EDM electrode whereby visual supervision of the workpiece is not impaired.

23. An electro-mechanical servo drive as set forth in claim 1 which further includes a holder for said workpiece, a diaphragm for mounting the holder to said rigid base, an electro-magnet spaced below and apart from said holder mounted on said rigid base, and means for repeatedly magnetizing said electro-magnet to induce vertical movement of said workpiece holder.

* * * * *